(12) United States Patent
Shintou et al.

(10) Patent No.: US 10,501,631 B2
(45) Date of Patent: Dec. 10, 2019

(54) COLORING COMPOUND AND THERMAL TRANSFER RECORDING SHEET

(71) Applicant: CANON KABUSHIKI KAISHA, Tokyo (JP)

(72) Inventors: Taichi Shintou, Saitama (JP); Koromo Shirota, Kawasaki (JP); Yuko Katsumoto, Yokohama (JP); Tsuyoshi Santo, Yokohama (JP); Hajime Muta, Zama (JP); Tomoyuki Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/897,076

(22) Filed: Feb. 14, 2018

(65) Prior Publication Data
US 2018/0237640 A1 Aug. 23, 2018

(30) Foreign Application Priority Data
Feb. 17, 2017 (JP) .................................. 2017-028002

(51) Int. Cl.
| | | |
|---|---|---|
| C09B 29/36 | (2006.01) | |
| C09D 11/32 | (2014.01) | |
| C09B 29/42 | (2006.01) | |
| B41M 5/388 | (2006.01) | |
| B41M 5/385 | (2006.01) | |
| C09B 55/00 | (2006.01) | |
| C09D 11/328 | (2014.01) | |
| C09B 1/20 | (2006.01) | |

(52) U.S. Cl.
CPC ......... C09B 29/3626 (2013.01); B41M 5/388 (2013.01); B41M 5/3858 (2013.01); C09B 1/201 (2013.01); C09B 29/363 (2013.01); C09B 55/009 (2013.01); C09D 11/328 (2013.01); B41M 2205/30 (2013.01)

(58) Field of Classification Search
None
See application file for complete search history.

(56) References Cited

U.S. PATENT DOCUMENTS 7,901,261 B1 * 3/2011 Rosas Zarich ........ B63B 35/812
280/14.22
9,910,375 B2 * 3/2018 Sekiguchi .............. G03G 9/091

FOREIGN PATENT DOCUMENTS

| JP | 2007-290343 A | 11/2007 |
| WO | 2008/114886 A1 | 9/2008 |

* cited by examiner

Primary Examiner — Samantha L Shterengarts
(74) Attorney, Agent, or Firm — Canon U.S.A. Inc., IP Division

(57) ABSTRACT

A thermal transfer recording sheet includes a base material and, on the base material, a yellow-dye layer containing a yellow dye, a magenta-dye layer containing a magenta dye, and a cyan-dye layer containing a cyan dye. The yellow dye and the cyan dye contain compounds having specific structures.

2 Claims, 1 Drawing Sheet

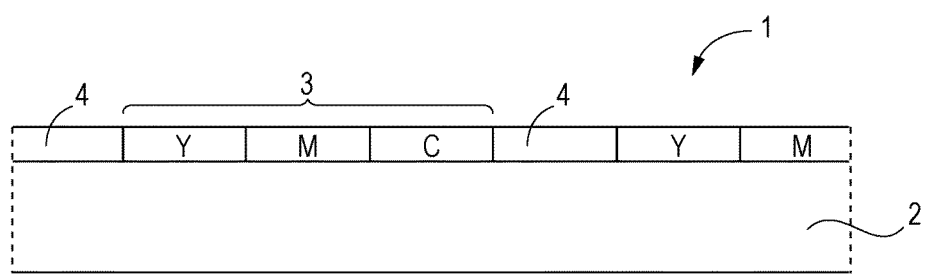

COLORING COMPOUND AND THERMAL TRANSFER RECORDING SHEET

BACKGROUND OF THE INVENTION

Field of the Invention

The present disclosure relates to a coloring compound and a thermal transfer recording sheet.

Description of the Related Art

In recent years, with the widespread use of portable color display devices, the demand for easy color printing of photographs taken and documents prepared with the devices has been increasing. Examples of a color-printing method that meets the demand include an electrophotographic method, an ink-jet method, and a thermal transfer recording method. The thermal transfer recording method enables printing by a dry process and miniaturization of a printer, thereby providing excellent portability. Thus, of the foregoing methods, the thermal transfer recording method is excellent due to easy printing in any environment. In addition, since this method uses a dye as a coloring material, density of an image can be controlled by using a concentration gradient of coloring materials, thereby resulting in clear images and excellent color reproducibility.

The thermal transfer recording method is an image forming method that includes placing a thermal transfer recording sheet on an image-receiving sheet and heating the thermal transfer recording sheet to transfer a coloring agent present in the thermal transfer recording sheet onto the image-receiving sheet. The thermal transfer recording sheet includes, on a sheet-shaped base material, a coloring-material layer containing a coloring agent that has heat-transfer properties. The image-receiving sheet includes a coloring-agent-receiving layer on a surface thereof. In the thermal transfer recording method, the coloring material contained in the coloring-material layer affects the speed of transfer recording, recorded image quality, and storage stability, and thus, it is a very important material.

Such a thermal transfer recording method uses ink sheets each containing a yellow dye, a magenta dye, or a cyan dye as a coloring material to produces images. Even if the use of a single dye for producing images provides sufficient light-fastness, the use of different dyes in combination for producing images may cause the phenomenon of poor light-fastness (Japanese Patent Laid-Open No. 2007-290343). This phenomenon is called catalytic fading, which occurs particularly in a mixture of a yellow dye and a cyan dye.

SUMMARY OF THE INVENTION

The present disclosure provides a coloring compound that is unlikely to cause catalytic fading of another color.

The present disclosure provides a thermal transfer recording sheet in which catalytic fading of a cyan dye is suppressed in a mixture of a yellow dye and a cyan dye.

According to the present disclosure, there is provided a thermal transfer recording sheet including a base material and a coloring-material layer on the base material. The coloring-material layer includes a yellow-dye layer containing a yellow dye, a magenta-dye layer containing a magenta dye, and a cyan-dye layer containing a cyan dye. The yellow dye contains at least one compound selected from compounds having a structure represented by Formula (1) or a structure represented by Formula (2). The cyan dye contains at least one compound selected from compounds having a structure represented by Formula (3) or a structure represented by Formula (4).

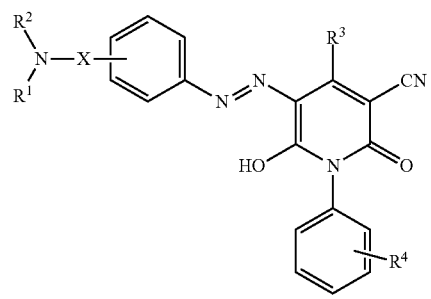

Formula (1)

In Formula (1), $R^1$ represents an alkyl group; $R^2$ represents a hydrogen atom or an alkyl group; $R^3$ represents an alkyl group, an unsubstituted aryl group, an aryl group having a substituent, or an amino group; $R^4$ represents a hydrogen atom, an alkyl group, or an alkoxy group; and X represents a carbonyl group or a sulfonyl group.

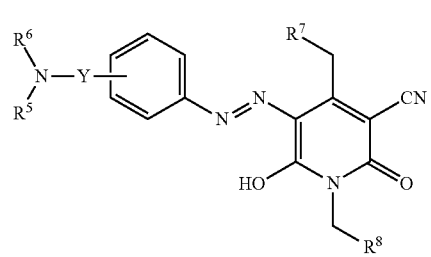

Formula (2)

In Formula (2), $R^5$ represents an alkyl group, $R^6$ represents a hydrogen atom or an alkyl group, $R^7$ and $R^8$ each independently represent an alkyl group, and Y represents a carbonyl group or a sulfonyl group.

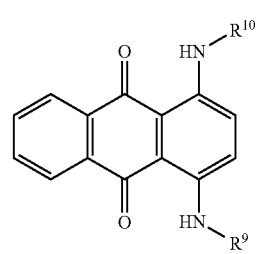

Formula (3)

In Formula (3), $R^9$ and $R^{10}$ each independently represent an alkyl group, an unsubstituted aryl group, or an aryl group having a substituent.

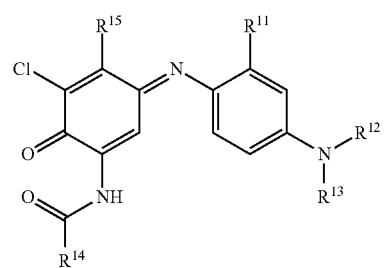

Formula (4)

In Formula (4), $R^{11}$ to $R^{15}$ each independently represent an alkyl group, an unsubstituted aryl group, or an aryl group having a substituent.

Further features of the present disclosure will become apparent from the following description of exemplary embodiments with reference to the attached drawing.

BRIEF DESCRIPTION OF THE DRAWINGS

FIGURE is a sectional view schematically illustrating the structure of a thermal transfer recording sheet used in Example 1.

DESCRIPTION OF THE EMBODIMENTS

Hereinafter, the present disclosure will be described in detail.

The present inventors have performed thorough investigations to solve the above-described problem, and as a result, found that the fading (catalytic fading) of a cyan dye in a mixture of a yellow dye and a cyan dye is suppressed by using a thermal transfer recording sheet containing a base material and a coloring-material layer on the base material, wherein the coloring-material layer includes a yellow-dye layer containing a yellow dye, a magenta-dye layer containing a magenta dye, and a cyan-dye layer containing a cyan dye, the yellow dye contains at least one compound selected from compounds having a structure represented by Formula (1) or a structure represented by Formula (2), and the cyan dye contains at least one compound selected from compounds having a structure represented by Formula (3) or a structure represented by Formula (4), thereby addressing the above-described problem.

The case where a yellow dye that is a compound having a structure represented by Formula (1) is mixed with a cyan dye that is at least one compound selected from compounds having a structure represented by Formula (3) or a structure represented by Formula (4) will be described.

A compound having a structure represented by Formula (1) in which the pyridone ring is substituted at the 1-position thereof by a phenyl group has large steric hindrance because the phenyl group is at a twisted position relative to the plane of the pyridone ring. Thus, the formation of an intermolecular hydrogen bond between the compound and a compound having a structure represented by Formula (3) or Formula (4) can be suppressed. This advantage can sufficiently be obtained even if the compound has a methyl group at the 4-position of the pyridone ring (substituent $R^3$). Therefore, catalytic fading of a cyan dye is likely to be suppressed in a mixture of a yellow dye and a cyan dye (Presumed Mechanism (1)).

In the case where a compound has a N-alkyl group at the 1-position of the pyridone ring, the N-alkyl group is above or below the plane of the pyridone ring. If the compound has a small group such as a methyl group at the 4-position of the pyridone ring, the effect of the steric hindrance is decreased. As a result, a cyan dye can approach the compound from the side of the compound opposite to the side where the N-alkyl group is present, and catalytic fading is likely to occur. Accordingly, in the case where the compound has a N-alkyl group at the 1-position of the pyridone ring, the compound needs to have an alkyl group (substituent $R^7$) having a long carbon chain at the 4-position of the pyridone ring. A carbon chain longer than an ethyl group provides the advantage of suppressing catalytic fading (Presumed Mechanism (2)).

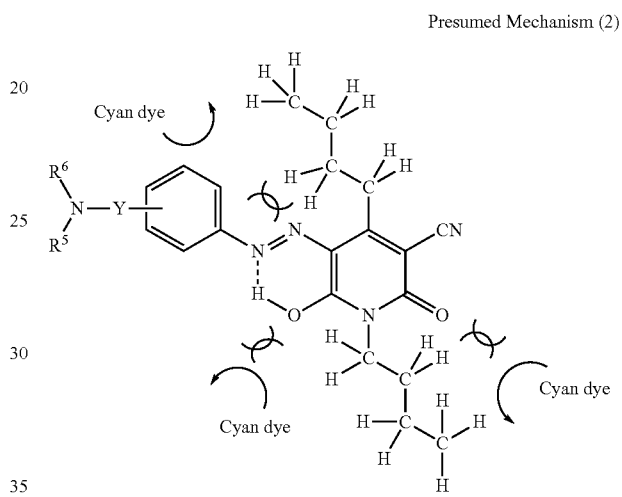

Presumed Mechanism (2)

In contrast, in the case where a compound has a methyl group as a substituent at the 1-position and as a substituent at the 4-position, the compound is sterically affected only to a slight extent by the substituent and thus, forms an intermolecular hydrogen bond with a compound having a structure represented by Formula (3) or a structure represented by Formula (4), thereby causing aggregation (Comparative Mechanism (1)). Therefore, catalytic fading of a cyan dye is likely to occur in a mixture of a yellow dye and a cyan dye.

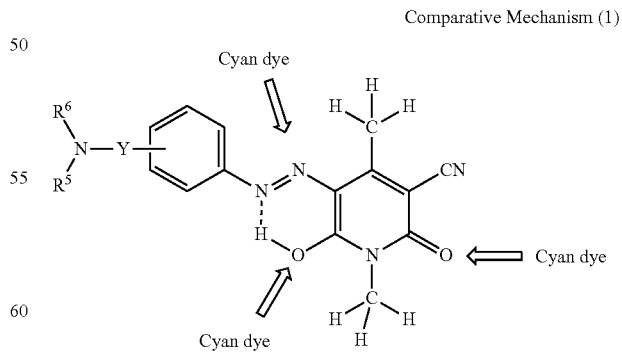

Comparative Mechanism (1)

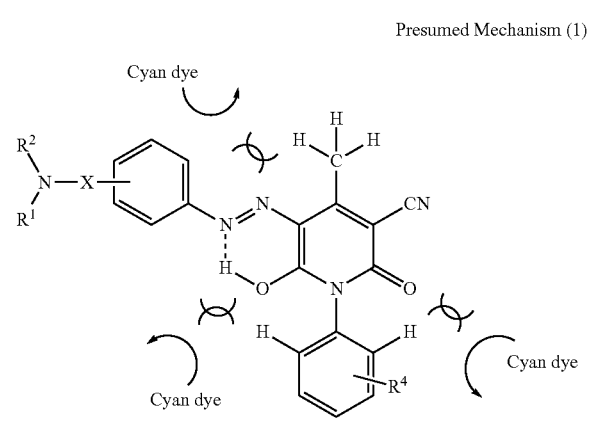

Presumed Mechanism (1)

In particular, the yellow dye can be a compound having a structure represented by Formula (2) because the yellow dye further suppresses catalytic fading of a cyan dye in a mixture of the yellow dye and a cyan dye.

Yellow Dye

A yellow dye containing a compound having a structure represented by Formula (1) will be described.

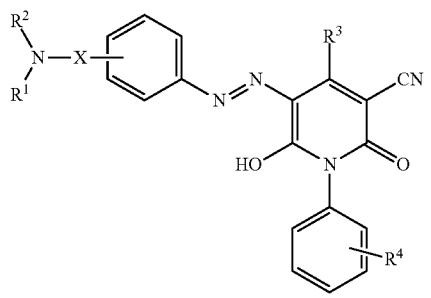

Formula (1)

In Formula (1), $R^1$ represents an alkyl group; $R^2$ represents a hydrogen atom or an alkyl group; $R^3$ represents an alkyl group, an unsubstituted aryl group, an aryl group having a substituent, or an amino group; $R^4$ represents a hydrogen atom, an alkyl group, or an alkoxy group; and X represents a carbonyl group or a sulfonyl group.

The alkyl groups of $R^1$ and $R^2$ are not particularly limited, and examples of the alkyl groups include primary to tertiary alkyl groups that are linear, branched, or cyclic and that have 1 to 20 carbon atoms. Specific examples include a methyl group, an ethyl group, an n-propyl group, an isopropyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of these alkyl groups, it is preferable that $R^1$ and $R^2$ be each independently an ethyl group, an n-butyl group, a sec-butyl group, a dodecyl group, a cyclohexyl group, a methylcyclohexyl group, a 2-ethylpropyl group, a 2-ethylhexyl group, or an octyl group. It is more preferable that $R^1$ and $R^2$ be each independently an n-butyl group, a 2-ethylhexyl group, or an octyl group. In addition, $R^1$ and $R^2$ are further preferably the same alkyl groups because catalytic fading of a cyan dye is further suppressed in a mixture of a yellow dye and a cyan dye.

The alkyl group of $R^3$ is not particularly limited, and examples of the alkyl group include alkyl groups having 1 to 8 carbon atoms, such as a methyl group, an ethyl group, a propyl group, and a butyl group.

The unsubstituted aryl group of $R^3$ is not particularly limited, and an example of the aryl group is a phenyl group. The aryl group may include a substituent, and an example of the substituent is a methyl group.

The amino group of $R^3$ is not particularly limited, and examples of the amino group include an amino group and a dimethylamino group.

Of these amino groups, $R^3$ is preferably an alkyl group, particularly, an alkyl group having 1 to 8 carbon atoms because catalytic fading of a cyan dye is further suppressed in a mixture of a yellow dye and a cyan dye. The alkyl group is more preferably an alkyl group having 1 to 4 carbon atoms for the similar reason.

The alkyl group of $R^4$ is not particularly limited, and the alkyl group can be an alkyl group having 1 to 4 carbon atoms because catalytic fading of a cyan dye is further suppressed in a mixture of a yellow dye and a cyan dye.

The alkoxy group of $R^4$ is not particularly limited, and examples of the alkoxy group include a methoxy group, an ethoxy group, an isopropoxy group, and a butoxy group.

X is a carbonyl group or a sulfonyl group. X can be a carbonyl group because catalytic fading of a cyan dye can be further suppressed in a mixture of a yellow dye and a cyan dye.

Formula (1) illustrates an azo form; however a hydrazo form, which is a tautomer, also falls within the technical scope of the present disclosure.

A compound having a structure represented by Formula (1) can be synthesized with reference to the known method described in International Publication No. WO 08/114886.

Compounds having a structure represented by Formula (1) can be Compounds (1) to (17), (41), and (42) below, which are shown as examples, but are not limited thereto.

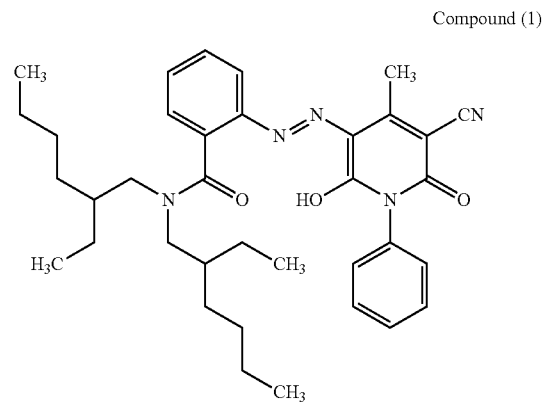

Compound (1)

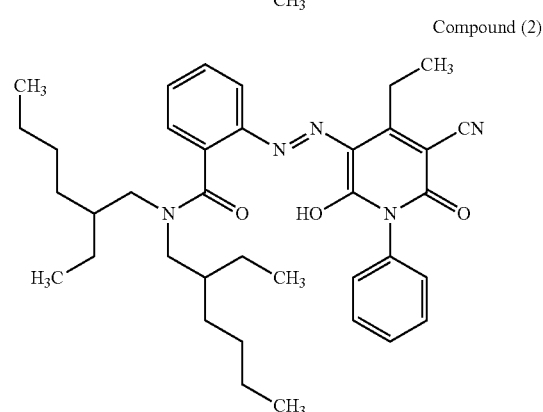

Compound (2)

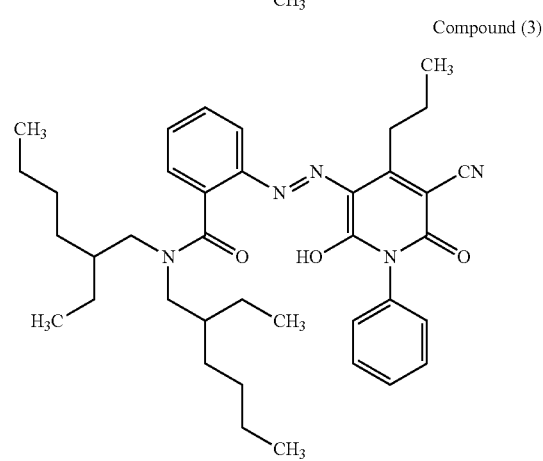

Compound (3)

Compound (4)
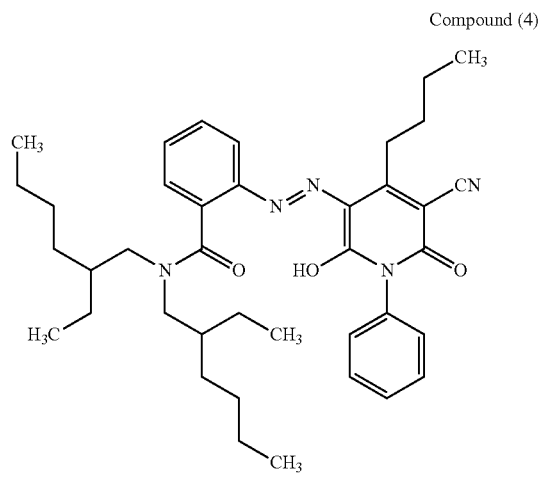
Compound (5)
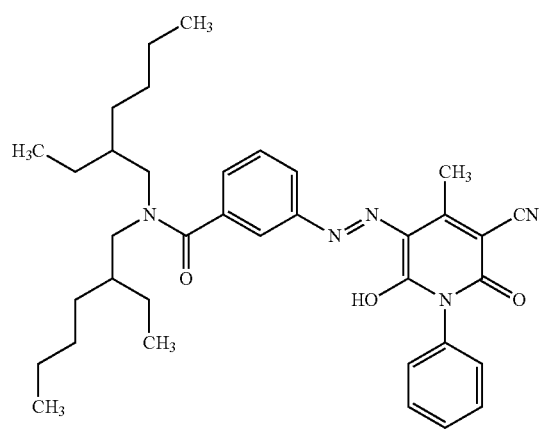
Compound (6)
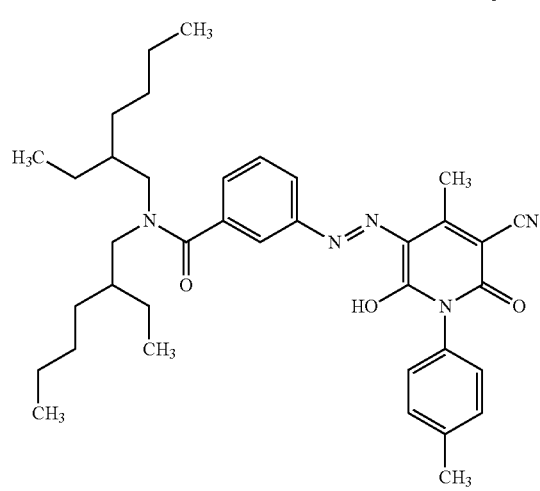
Compound (7)
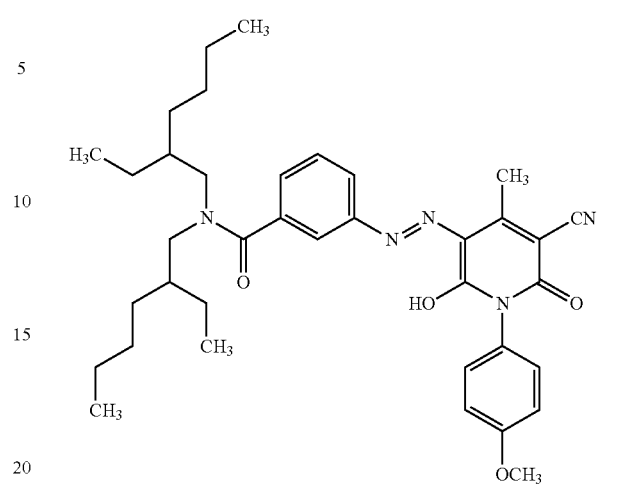
Compound (8)
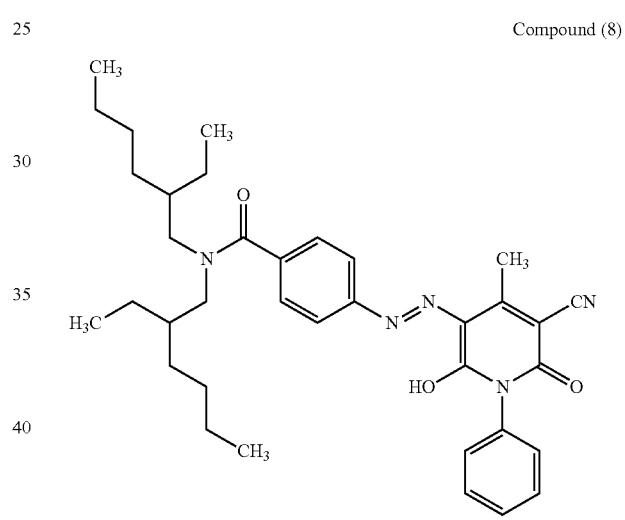
Compound (9)
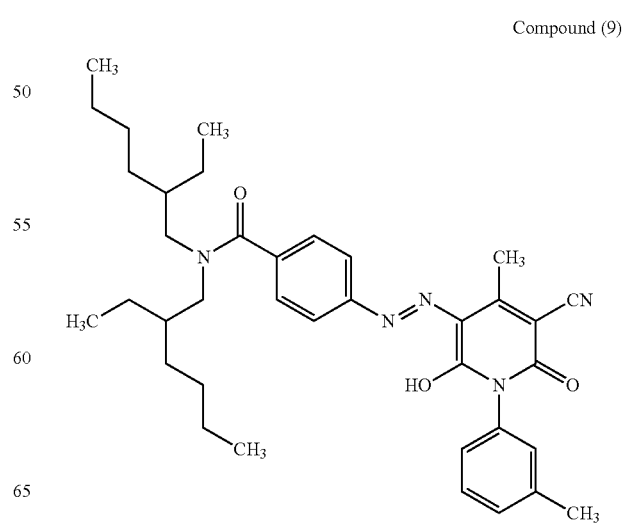

Compound (10)
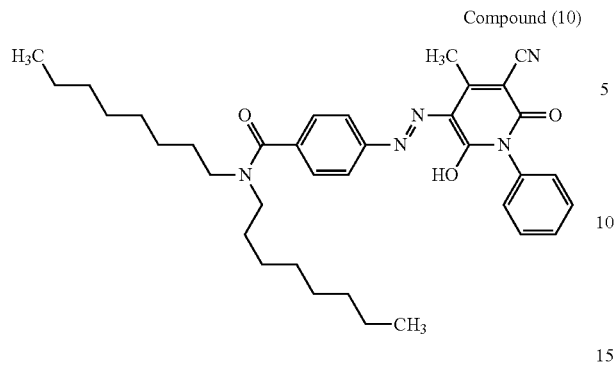
Compound (11)
Compound (12)
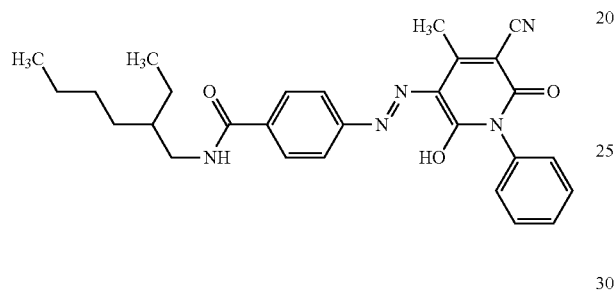
Compound (13)
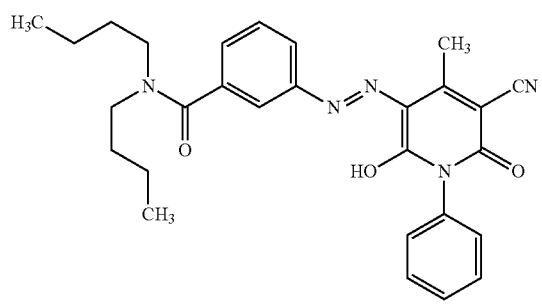
Compound (14)
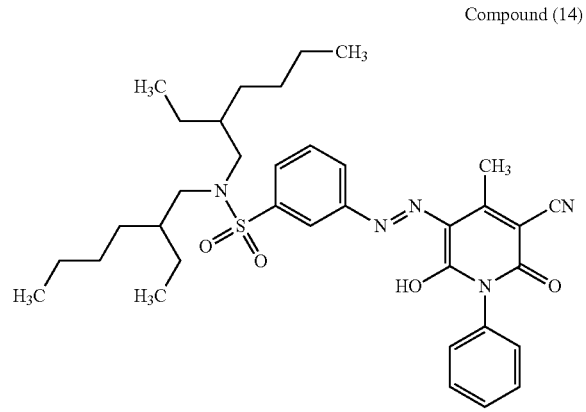
Compound (15)
Compound (16)
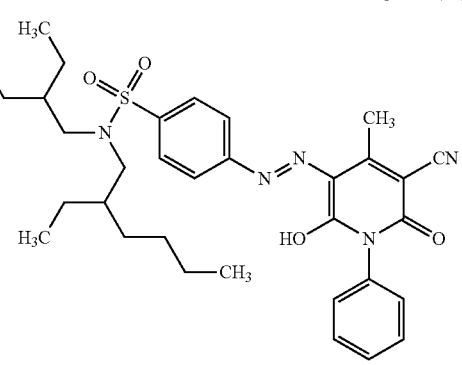
Compound (17)
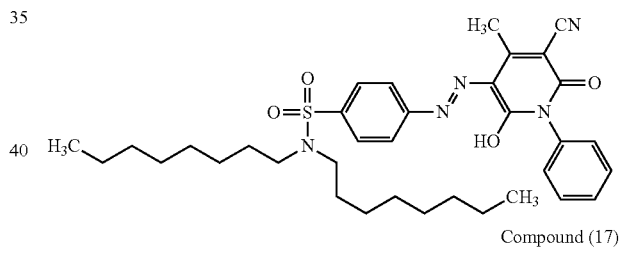
Compound (41)
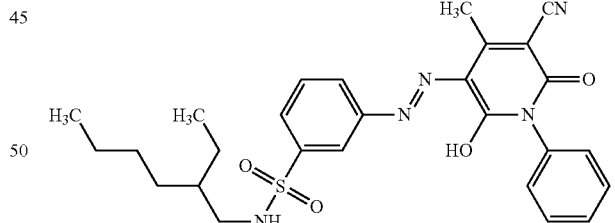
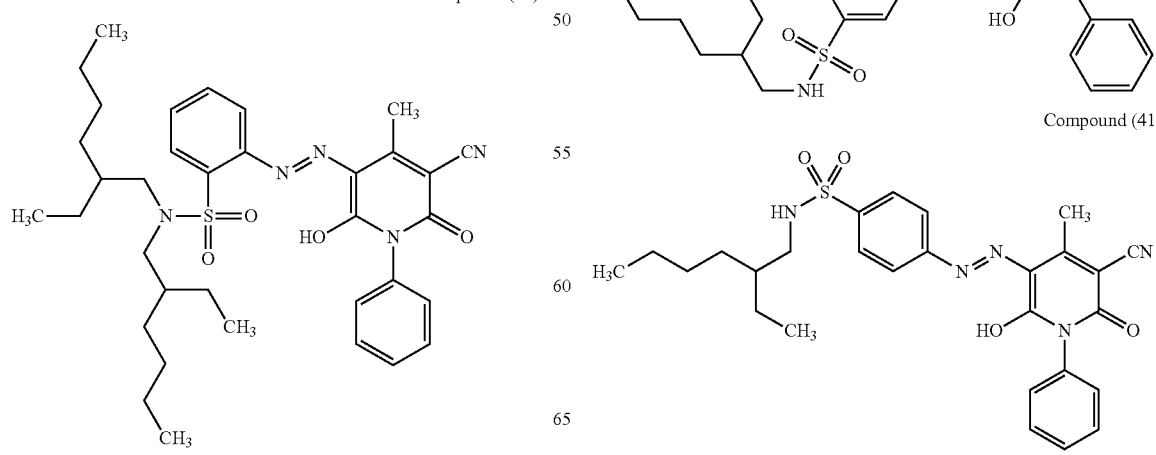

-continued

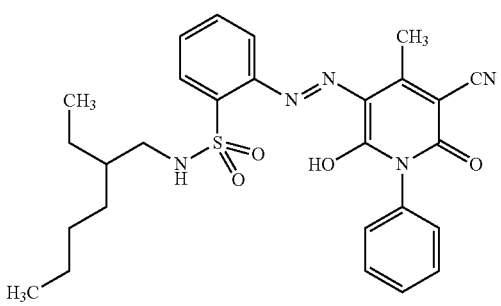

Compound (42)

Of these compounds, Compounds (1), (2), (5), (8), (10), (13), (14), (15), and (41) are preferable, and Compounds (1), (5), (8), and (41) are more preferable.

Next, a yellow dye containing a compound having a structure represented by Formula (2) will be described.

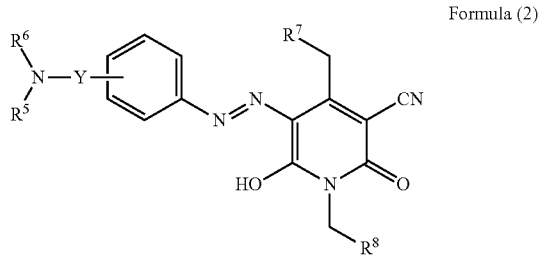

Formula (2)

In Compound (2), $R^5$ represents an alkyl group, $R^6$ represents a hydrogen atom or an alkyl group, $R^7$ and $R^8$ each independently represent an alkyl group, and Y represents a carbonyl group or a sulfonyl group.

$R^5$ and $R^6$ are not particularly limited, and examples of $R^5$ and $R^6$ include primary to tertiary alkyl groups that are linear, branched, or cyclic and that have 1 to 20 carbon atoms. Specific examples include a methyl group, an ethyl group, an n-propyl group, an isopropyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of these alkyl groups, it is preferable that $R^5$ and $R^6$ be each independently an ethyl group, an n-butyl group, a sec-butyl group, a dodecyl group, a cyclohexyl group, a methylcyclohexyl group, a 2-ethylpropyl group, a 2-ethylhexyl group, or an octyl group. It is more preferable that $R^5$ and $R^6$ be each independently an n-butyl group, a 2-ethylhexyl group, or an octyl group. In addition, $R^5$ and $R^6$ are further preferably the same alkyl groups because catalytic fading of a cyan dye is further suppressed in a mixture of a yellow dye and a cyan dye.

The alkyl groups of $R^7$ and $R^8$ are not particularly limited, and examples of the alkyl groups include alkyl groups having 1 to 7 carbon atoms, such as a methyl group, an ethyl group, a propyl group, a butyl group, a pentyl group, a hexyl group, and a heptyl group.

The alkyl groups of $R^7$ and $R^8$ can be the same alkyl groups of the above alkyl groups because catalytic fading of a cyan dye is further suppressed in a mixture of a yellow dye and a cyan dye.

Y is a carbonyl group or a sulfonyl group and can be a carbonyl group because catalytic fading of a cyan dye can be further suppressed in a mixture of a yellow dye and a cyan dye.

Formula (2) illustrates an azo form; however, a hydrazo form, which is a tautomer, also falls within the technical scope of the present disclosure.

A compound having a structure represented by Formula (2) can be synthesized with reference to the known method described in International Publication No. WO 08/114886.

Compounds having a structure represented by Formula (2) can be Compounds (18) to (27) and (43) to (45) below, which are shown as examples, but are not limited thereto.

Compound (18)

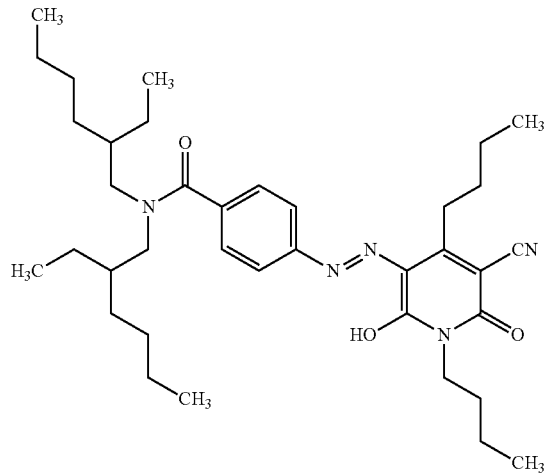

Compound (19)

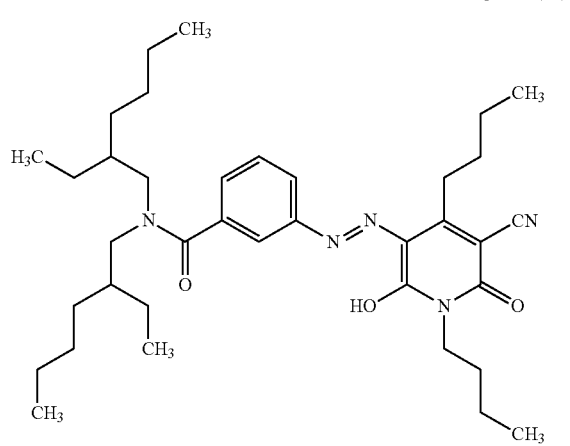

Compound (20)
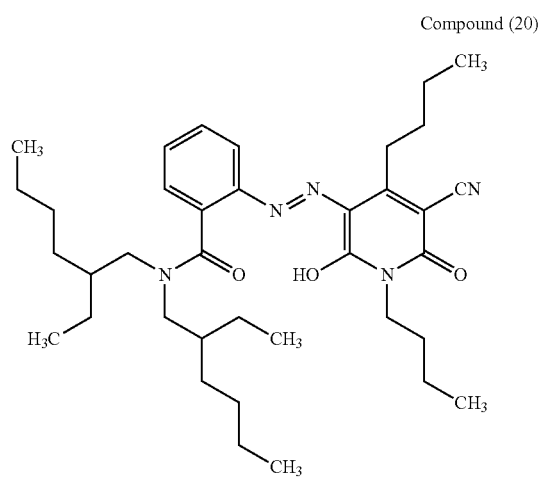
Compound (21)
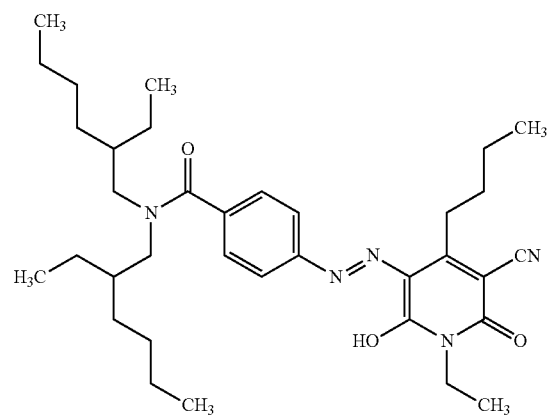
Compound (22)
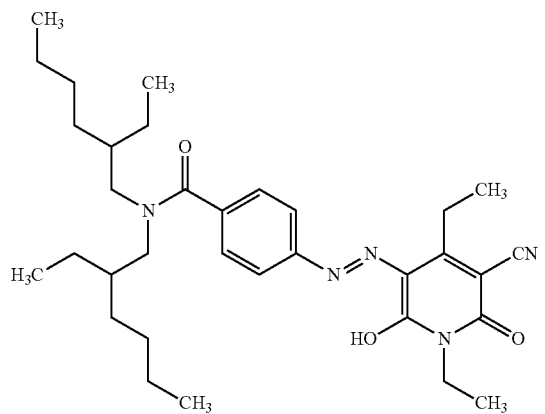
Compound (23)
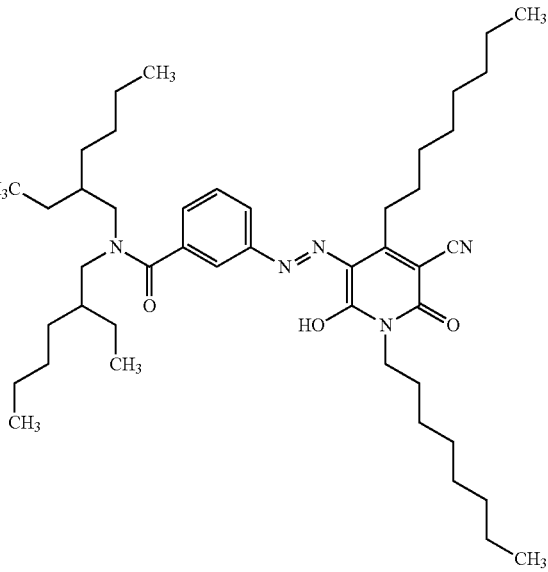
Compound (24)
Compound (25)
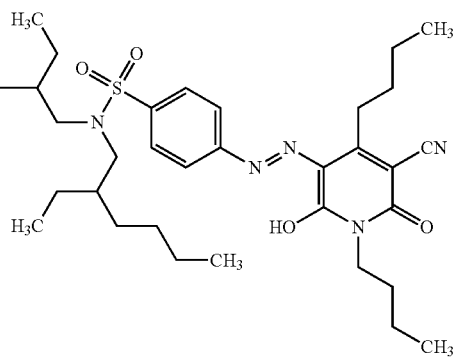

Compound (26)

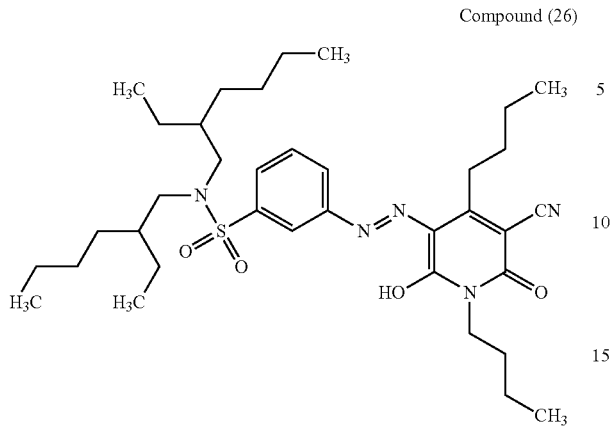

Compound (27)

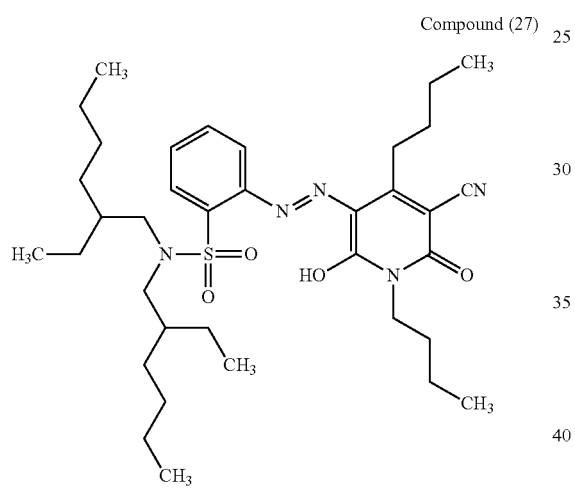

Compound (43)

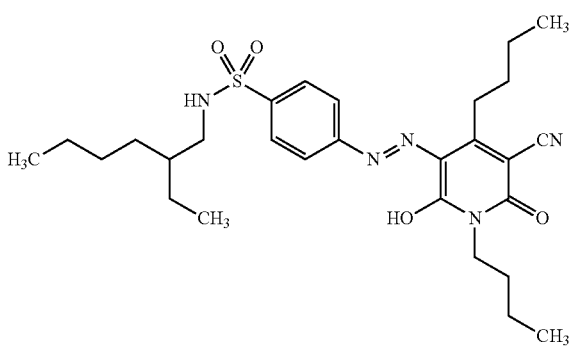

Compound (44)

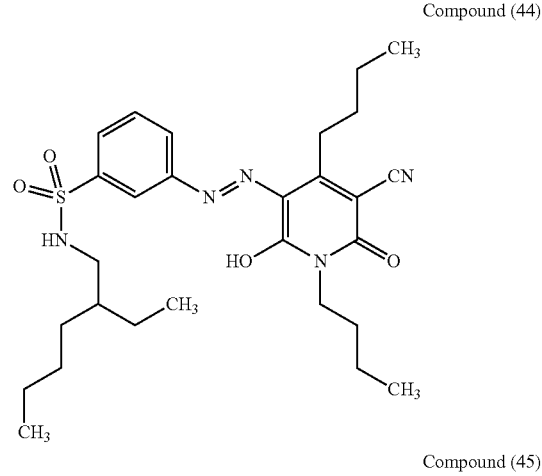

Compound (45)

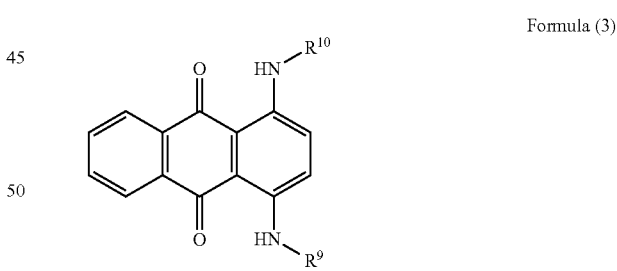

Of these compounds, Compounds (18), (19), (20), (21), (24), (25), (26), and (43) are preferable, and Compounds (18), (24), and (43) are more preferable.

Cyan Dye

Next, a cyan dye containing a compound having a structure represented by Formula (3) will be described.

Formula (3)

In Formula (3), $R^9$ and $R^{10}$ each independently represent an alkyl group, an unsubstituted aryl group, or an aryl group having a substituent.

The alkyl groups of $R^9$ and $R^{10}$ are not particularly limited, and examples of the alkyl groups include primary to tertiary alkyl groups that are linear, branched, or cyclic and that have 1 to 20 carbon atoms. Specific examples include a methyl group, an ethyl group, an n-propyl group, an isopropyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, the alkyl group can be a methyl group or an ethyl group because catalytic fading of a cyan dye is further suppressed in a mixture of a yellow dye and a cyan dye.

The aryl groups of $R^9$ and $R^{10}$ are not particularly limited, and examples of the aryl groups include a phenyl group and a naphthyl group. In particular, the aryl group can be a phenyl group because catalytic fading of a cyan dye is further suppressed in a mixture of a yellow dye and a cyan dye. If the aryl group has a substituent, the substituent may be an alkyl group.

Compounds having a structure represented by Formula (3) can be Compounds (28) to (33) below, which are shown as examples, but are not limited thereto.

Compound (28)

Compound (29)

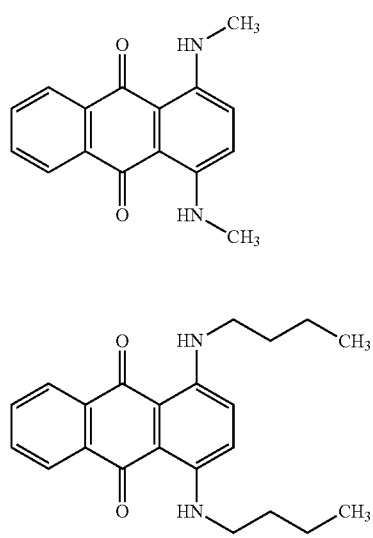

Compound (30)

Compound (31)

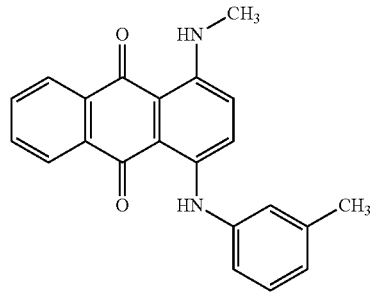

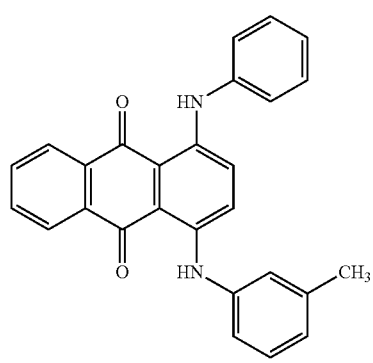

Compound (32)

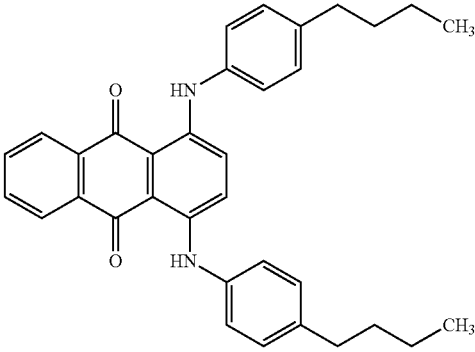

Compound (33)

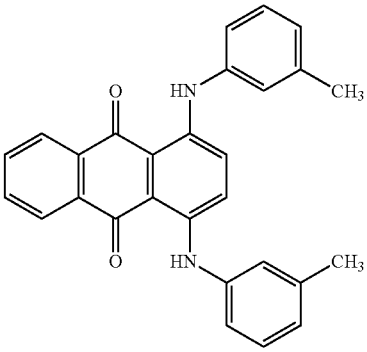

Of these compounds, Compounds (29), (30), and (31) are preferable, and Compound (30) is more preferable.

Next, a cyan dye containing a compound having a structure represented by Formula (4) will be described.

Formula (4)

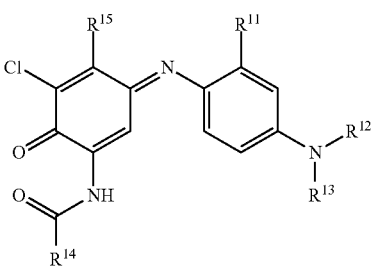

In Formula (4), $R^{11}$ to $R^{15}$ each independently represent an alkyl group, an unsubstituted aryl group, or an aryl group having a substituent.

The alkyl groups of $R^{11}$ to $R^{15}$ are not particularly limited, and examples of the alkyl groups include primary to tertiary alkyl groups that are linear, branched, or cyclic and that have 1 to 20 carbon atoms. Specific examples are a methyl group, an ethyl group, an n-propyl group, an isopropyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. In particular, the alkyl group can be an alkyl group having 1 to 2 carbon atoms such as a methyl group or an ethyl group because catalytic fading of a cyan dye is further suppressed in a mixture of a yellow dye and a cyan dye.

The aryl groups of $R^{11}$ to $R^{15}$ are not particularly limited, and examples of the aryl groups include a phenyl group and a naphthyl group. In particular, the aryl group can be a phenyl group because catalytic fading of a cyan dye is further suppressed in a mixture of a yellow dye and a cyan dye.

Compounds having a structure represented by Formula (4) can be Compounds (34) to (40) below, which are shown as examples, but are not limited thereto.

Compound (34)
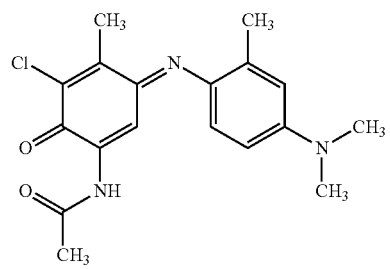

Compound (35)
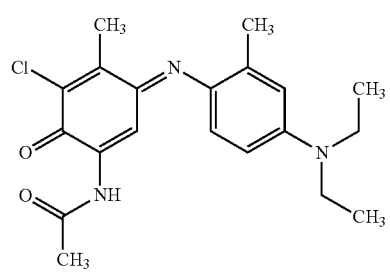

Compound (36)
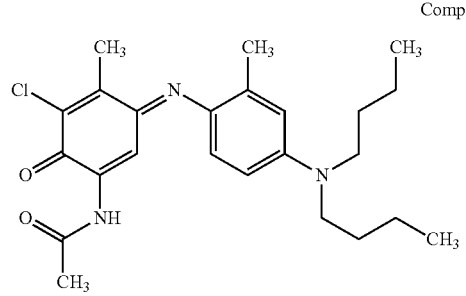

Compound (37)
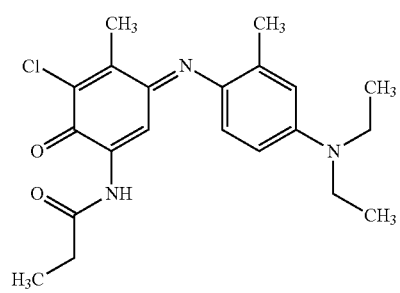

Compound (38)
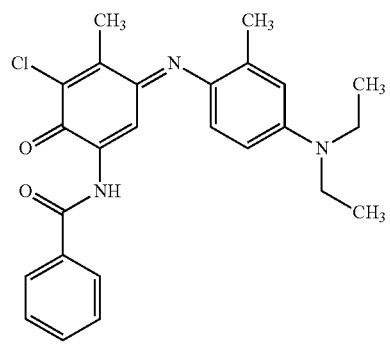

Compound (39)
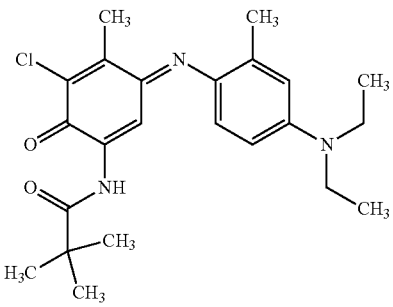

Compound (40)
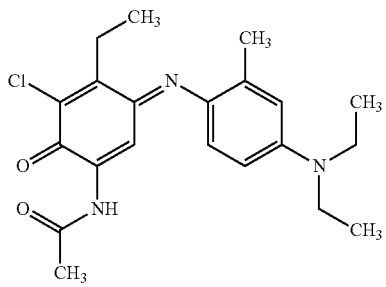

Of these compounds, Compounds (34), (35), and (36) are preferable, and Compound (35) is more preferable.

Thermal Transfer Recording Sheet

A thermal transfer recording sheet according to the present disclosure includes a base material and a coloring-material layer on the base material. The coloring-material layer includes at least a yellow-dye layer containing a yellow dye, a magenta-dye layer containing a magenta dye, and a cyan-dye layer containing a cyan dye.

The yellow dye contains a compound having a structure represented by Formula (1) or a structure represented by Formula (2). The cyan dye contains a compound having a structure represented by Formula (3) or a structure represented by Formula (4).

Image formation using the thermal transfer recording sheet is performed as described below.

The thermal transfer recording sheet is placed on an image-receiving sheet including a coloring-material-receiving layer on a surface thereof such that the coloring-material layer and the coloring-material-receiving layer face each other, and the thermal transfer recording sheet is heated using a heating unit, such as a thermal head. In this way, the coloring material in the thermal transfer recording sheet is sublimated and transferred to the image-receiving sheet.

Hereinafter, the features of the thermal transfer recording sheet according to the present disclosure will be described.

Base Material

The base material included in the thermal transfer recording sheet according to the present disclosure supports the coloring-material layer described later and may be a known base material. The base material is not particularly limited, provided that it has thermal resistance and strength to some extent. Examples of the base material include polyethylene terephthalate films, polyethylene naphthalate films, polycarbonate films, polyimide films, polyamide films, aramid films, polystyrene films, 1,4-polycyclohexylene dimethylene terephthalate films, polysulfone films, polypropylene films, polyphenylene sulfide films, polyvinyl alcohol films, cellophane films, cellulose-derivative films, polyethylene films, polyvinyl chloride films, nylon films, condenser paper, and paraffin paper.

In particular, polyethylene terephthalate films can be used from the viewpoint of mechanical strength, solvent resistance, and economy.

The base material has a thickness of 0.5 µm to 50 µm, preferably 3 µm to 10 µm, from the viewpoint of transfer properties.

One surface or both surfaces of the base material can be subjected to adhesion treatment, if necessary. In the case where a coating liquid containing a dye ink is applied to the base material to form a coloring-material layer, wettability, adhesiveness, and the like of the coating liquid are likely to be insufficient; therefore, the adhesion treatment can typically be performed.

The adhesion treatment is not particularly limited. Examples of the adhesion treatment include ozone treatment, corona discharge treatment, ultraviolet treatment, plasma treatment, low-temperature plasma treatment, primer treatment, and chemical treatment. Two or more of these treatments may be performed in combination.

The adhesion treatment of the base material may include coating the base material with an adhesion layer.

The material used for the adhesion layer is not particularly limited. Examples of the material include organic materials such as polyester resins, polystyrene resins, polyacrylate resins, polyamide resins, polyether resins, polyvinyl acetate resins, polyethylene resins, polypropylene resins, polyvinyl chloride resins, polyvinyl alcohol resins, and polyvinyl butyral resins; and inorganic fine particles such as silica, alumina, magnesium carbonate, magnesium oxide, and titanium oxide particles.

Coloring-Material Layer

The thermal transfer recording sheet according to the present disclosure includes a coloring-material layer on the base material. The coloring-material layer includes at least a yellow-dye layer, a magenta-dye layer, and a cyan-dye layer. The thermal transfer recording sheet may further include a dye layer that is a known existing black dye layer.

In the thermal transfer recording sheet according to the present disclosure, the dye layers are formed in such a manner that the dye layers are sequentially arranged in plane (not stacked on top of each other, but disposed side by side) on the base material, but the manner is not particularly limited. For example, the yellow-dye layer, the magenta-dye layer, and the cyan-dye layer are repeatedly formed on the base material sheet in the movement direction of the base material. In the case where this thermal transfer recording sheet is used, image formation is performed such that a yellow image, a magenta image, and a cyan image are formed in the above order to form a full-color image. The series of image formation is repeatedly performed. A transferable protective layer may be added to these dye layers in such a manner that the layers are sequentially arranged in plane. A heat-meltable black layer may also be added.

According to the present disclosure, the yellow dye contained in the yellow-dye layer is at least one compound selected from compounds having a structure represented by Formula (1) or a structure represented by Formula (2) above, and the cyan dye contained in the cyan-dye layer is at least one compound selected from compounds having a structure represented by Formula (3) or a structure represented by Formula (4) above.

A known coloring agent for thermal transfer recording may be used in combination in the yellow-dye layer, the cyan-dye layer, and the magenta-dye layer, provided that the use of the known coloring agent does not have an harmful effect on obtaining image samples in which catalytic fading of the cyan dye is suppressed in a mixture of the yellow dye and the cyan dye.

In addition, other dyes may be used in combination with the above dyes. The dyes that can be used in combination are known existing dyes for thermal transferring and are not particularly limited, provided that the dyes are sublimated and transferred by heat. Such dyes are selected in consideration of hue, printing sensitivity, lightfastness, storage stability, solubility in a binder resin, and the like.

Each dye layer contains a dye coloring agent and a binder resin. The method for forming a dye layer is not particularly limited. Each dye layer is typically produced as follows.

While being stirred, the above specific dye, a binder resin, and if necessary a surfactant and wax are gradually added into a medium and are sufficiently blended with the medium. Furthermore, a mechanical shear force is applied using a dispersing device to stably dissolve the composition or disperse it into fine particles, thereby preparing an ink. Next, the ink is applied to a base film serving as the base material and dried, thereby producing a dye layer on the base material. The amount of ink applied may be determined such that the coloring-material layer has a thickness in the range of 0.1 µm to 5 µm after being dried, from the viewpoint of transfer properties.

The medium that can be used in the production method is not particularly limited. Examples of the medium include water and organic solvents. Examples of the organic solvents that can be used include alcohols such as methanol, ethanol, isopropanol, and isobutanol; cellosolves such as methyl cellosolve and ethyl cellosolve; aromatic hydrocarbons such as toluene, xylene, and chlorobenzene; esters such as ethyl acetate and butyl acetate; ketones such as acetone, methyl ethyl ketone, methyl isobutyl ketone, and cyclohexanone; halogenated hydrocarbons such as methylene chloride, chloroform, and trichloroethylene; ethers such as tetrahydrofuran and dioxane; and N,N-dimethylformamide and N-methylpyrrolidone. These organic solvents may be used alone or in a combination of two or more.

The amount of dye used is 50 to 300 parts by mass relative to 100 parts by mass of the binder resin, preferably 80 to 280 parts by mass, more preferably 85 to 250 parts by mass, from the viewpoint of transfer properties. In the case where a mixture of two or more dyes is used, the above-described amount of dye used corresponds to the total parts by mass of the dyes.

Examples of the binder resin used in the present disclosure include various resins. Of these resins, examples of the binder resin that can be used include water-soluble resins such as cellulose resins, polyacrylic acid resins, starch resins, and epoxy resins; and organic-solvent-soluble resins such as polyacrylate resins, polymethacrylate resins, polystyrene resins, polycarbonate resins, polyethersulfone resins, polyvinyl butyral resins, ethyl cellulose resins, acetyl cellulose resins, polyester resins, AS resins, and phenoxy resin. These resins may be used alone or in a combination of two or more, if necessary.

Other Components

The thermal transfer recording sheet according to the present disclosure may contain a surfactant to provide sufficient smoothness when a thermal head is heated (during printing). Examples of the surfactant that may be added include cationic surfactants, anionic surfactants, and non-ionic surfactants.

Examples of the cationic surfactants include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactants include fatty acid soaps such as sodium stearate and sodium dodecanoate; and sodium dodecyl sulfate, sodium dodecylbenzene sulfate, and sodium lauryl sulfate.

Examples of the nonionic surfactants include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

The thermal transfer recording sheet may contain wax to provide sufficient smoothness while the thermal head is not heated. Examples of the wax that may be added include polyethylene wax, paraffin wax, and fatty ester wax; however, the wax is not limited thereto.

The thermal transfer recording sheet may contain an ultraviolet absorber, an antiseptic, an antioxidant, an antistatic agent, and a viscosity controlling agent, in addition to the above additives, if necessary.

To improve the moving performance of the thermal head and heat resistance, the thermal transfer recording sheet can include a heat-resistant smooth layer on a surface of the base material opposite to the surface where the coloring-material layer is disposed. The heat-resistant smooth layer is made of a heat-resistant resin. The heat-resistant resin is not particularly limited. Examples of the heat-resistant resin include polyvinyl butyral resins, polyvinyl acetal resins, polyester resins, polyether resins, polybutadiene resins, vinyl chloride-vinyl acetate copolymer resins, styrene-butadiene copolymer resins, polyurethane acrylates, polyester acrylates, polyimide resins, and polycarbonate resins.

The heat-resistant smooth layer may further contain lubricants, crosslinking agents, release agents, heat-resistant fine particles, and the like.

Examples of the lubricant include amino-modified silicone compounds and carboxy-modified silicone compounds. Examples of the heat-resistant fine particles include fine particles such as silica. An example of the binder is an acrylic resin. The lubricant, the heat-resistant fine particles, and the binder are not limited to such examples The heat-resistant smooth layer is formed by adding and dissolving or dispersing the above-described resin and additives in a solvent and applying the resultant heat-resistant smooth layer coating liquid. The method for applying the heat-resistant smooth layer coating liquid is not particularly limited. Examples of the method include methods using a bar coater, a gravure coater, a reverse roll coater, a rod coater, and an air doctor coater. In particular, the method using a gravure coater can be used. The amount of heat-resistant smooth layer coating liquid applied may be determined such that the heat-resistant smooth layer has a thickness in the range of 0.1 μm to 5 μm after being dried, from the viewpoint of transfer properties.

After application, drying can be performed at 50° C. to 120° C. for about 1 second to 5 minutes, but the drying conditions are not particularly limited. Insufficient drying causes scumming, offset of the dye ink during winding, and kickback, in which the set-off ink retransfers to a dye layer of a different color during rewinding.

Heating Unit

The heating unit for heating the thermal transfer recording sheet is not particularly limited. Infrared rays and laser light may be used for heating as well as thermal heads used in a typical method. In addition, heating may be performed by supplying current to the base film. In this case, an electrification heating film that generates heat may be used to provide an electrification-type dye-transfer sheet.

EXAMPLES

Hereinafter, the present disclosure will be described in more detail with reference to Examples and Comparative Examples; however, the present invention is not limited to such examples. In the description, parts are by mass unless otherwise specified. The resulting compounds were identified by using a $^1$H-nuclear magnetic resonance ($^1$H-NMR) spectrometer (ECA-400, manufactured by JEOL Ltd.) and a LC/TOF MS device (LC/MSD TOF, manufactured by Agilent Technologies Ltd.).

Coloring Compound Having Structure Represented by Formula (1) or Formula (2)

A coloring compound having a structure represented by Formula (1) or a structure represented by Formula (2) is a coloring compound synthesized by a method described in International Publication No. WO 08/114886.

Comparative Compounds

As comparative compounds, the compounds illustrated below were used.

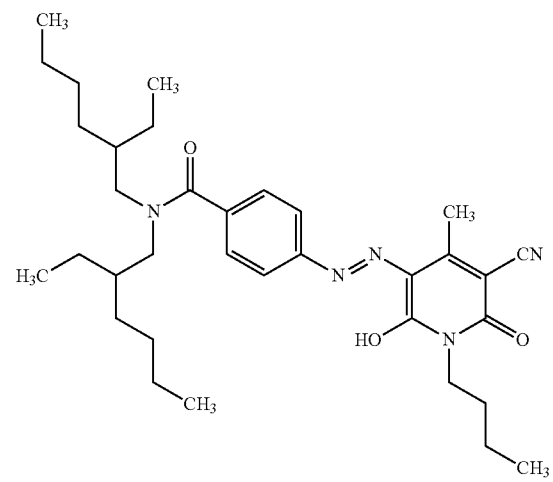

Comparative Compound (1)

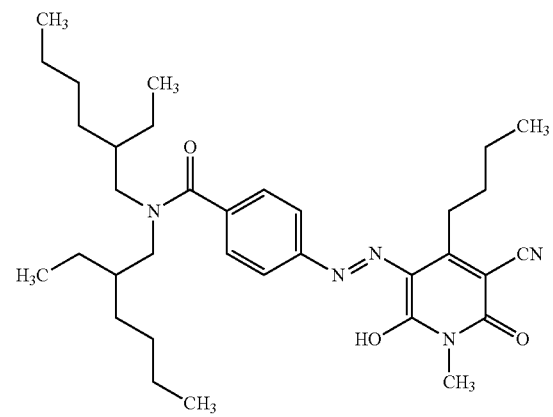

Comparative Compound (2)

-continued

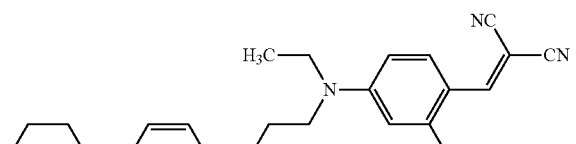

Comparative Compound (3)

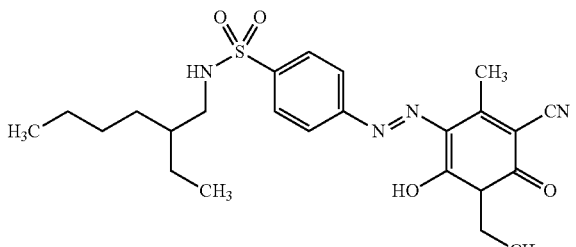

Comparative Compound (4)

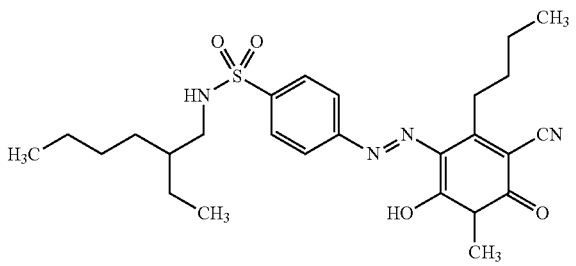

Comparative Compound (5)

Production of Thermal Transfer Recording Sheet
Yellow-Ink Preparation Example 1

In a solution mixture of 45 parts of methyl ethyl ketone/45 parts of toluene, 5 parts of a polyvinyl butyral resin (Denka 3000-K; manufactured by (Denka Company Limited) was gradually added and dissolved. In the resultant solution, 5 parts of Compound (1) was added and dissolved completely, thereby obtaining a yellow ink (Y1) used for producing the thermal transfer recording sheet.

Yellow-Ink Preparation Examples 2 to 12

Yellow inks (Y2) to (Y12) were obtained in the same manner as in Yellow-Ink Preparation Example 1, except that the yellow dyes (example compounds and comparative compounds) shown in Table 1 were used instead of Compound (1)

TABLE 1

| | Yellow dye |
|---|---|
| Y1 | Compound (1) |
| Y2 | Compound (5) |
| Y3 | Compound (8) |
| Y4 | Compound (18) |
| Y5 | Compound (24) |
| Y9 | Compound (41) |
| Y10 | Compound (42) |
| Y6 | Comparative Compound (1) |
| Y7 | Comparative Compound (2) |
| Y8 | Comparative Compound (3) |
| Y11 | Comparative Compound (4) |
| Y12 | Comparative Compound (5) |

Cyan-Ink Preparation Examples 1 to 3

The cyan inks (C1) to (C3) were obtained in the same manner as in Yellow Ink Preparation Example 1, except that the cyan dyes and the compositions shown in Table 2 were used instead of Compound (1). In the case where a plurality of dyes were used in combination, an ink was prepared such that the total amount of the dyes was 5.0 parts.

TABLE 2

| | Cyan dye represented by Formula 3 | | Cyan dye represented by Formula 4 | |
|---|---|---|---|---|
| | Type | Number of parts | Type | Number of parts |
| C1 | Compound (30) | 5.0 | — | — |
| C2 | Compound (30) | 2.5 | Compound (35) | 2.5 |
| C3 | — | — | Compound (35) | 5.0 |

Example 1

The base material was a polyethylene terephthalate film (Lumirror (trade name); manufactured by Toray Industries, Inc.) having a thickness of 4.5 μm. The yellow ink (Y1) was applied to the base material such that the thickness after drying was 1 μm and was then dried, thereby forming a yellow-dye layer.

FIGURE is a sectional view schematically illustrating the structure of a thermal transfer recording sheet used in Example 1. A thermal transfer recording sheet 1 includes a coloring-material layer 3 and a protecting layer 4 on a base material 2. The coloring-material layer 3 includes a yellow-dye layer Y, a magenta-dye layer M, and a cyan-dye layer C.

As described above, a yellow-dye layer of a thermal transfer recording sheet (color ink KL-36IP for compact photo printer SELPHY CP1200, manufactured by CANON KABUSHIKI KAISHA) was cut. The thermal transfer recording sheet included a yellow-dye layer Y, a magenta-dye layer M, a cyan-dye layer C, and the protecting layer 4. Then, a yellow-dye layer formed using the yellow ink (Y1) and having the same size (width, length, and thickness) as the cut yellow-dye layer was pasted at the place where the yellow-dye layer was cut.

A cyan-dye layer was formed in the same manner as the yellow-dye layer, except that the cyan ink (C1) was used instead of the yellow ink (Y1). Then a cyan-dye layer of the thermal transfer recording sheet was cut, and the cyan-dye layer formed using the cyan ink (C1) was pasted at the place where the cyan-dye layer was cut.

The full-color thermal transfer recording sheet produced in such a manner was used to transfer an image to photographic paper using a modified SELPHY, thereby producing an image sample (1). At an output controlled such that the optical density (OD) of each single color was 1.0, an image was printed with the cyan ink alone. Also, at the same output, an image was printed with the yellow ink and the cyan ink in that order such that two colors overlapped each other, thereby obtaining a mixed-color image sample.

Examples 2 to 16 and Comparative Examples 1 to 15

A thermal transfer recording sheet including a yellow-dye layer and a cyan-dye layer was produced in the same manner as in Example 1, except that the inks shown in Table 3 were used instead of the inks used in Example 1.

Image samples 2 to 16 and Comparative image samples 2 to 16 were produced using the resulting thermal transfer recording sheets in the same manner as in Example 1.

Evaluation of Fading of Cyan Dye in Mixture of Yellow Dye and Cyan Dye

Each image sample was placed in a xenon test apparatus (Atlas Weather-ometer Ci4000, manufactured by Toyo Seiki Seisaku-sho, Ltd.) and was exposed for 40 hours under the following conditions: luminous intensity, 0.28 W/m² at 340 nm; temperature, 40° C.; and relative humidity, 50%. The initial optical density was denoted as $OD_0$, and the optical density after 40-hour exposure was denoted as $OD_{40}$. The residual OD percentage was then defined as follows:

Residual OD percentage=$OD_{40}/OD_0 \times 100$

The residual OD percentage of a cyan ink used alone ($COD_{40}/COD_0 \times 100$) and the residual OD percentage of a cyan component in the image printed with a yellow ink and a cyan ink overlapping each other ($GCOD_{40}/GCOD_0 \times 100$) were calculated. Furthermore, "difference in residual OD percentage" calculated from the equation below was obtained.

Difference in residual OD percentage=$((COD_{40}/COD_0)-(GCOD_{40}/GCOD_0)) \times 100$ Evaluation criteria are as follows:
A: Difference in residual OD percentage<10
B: 10≤Difference in residual OD percentage<15
C: Difference in residual OD percentage≥15

Table 3 shows the results. When the difference in residual OD percentage was less than 10, it was determined that catalytic fading of a cyan dye was suppressed.

TABLE 3

| | Yellow-dye layer | Cyan-dye layer | Cyan ink residual OD percentage (used alone) | Cyan ink residual OD percentage (in mixture) | Residual OD percentage difference | Fading evaluation |
|---|---|---|---|---|---|---|
| Example 1 | Y1 | C1 | 98 | 91 | 7 | A |
| Example 2 | Y2 | C1 | 98 | 90 | 8 | A |
| Example 3 | Y3 | C1 | 98 | 92 | 6 | A |
| Example 4 | Y4 | C1 | 98 | 90 | 8 | A |
| Example 5 | Y5 | C1 | 98 | 91 | 7 | A |
| Example 6 | Y3 | C2 | 90 | 82 | 8 | A |
| Example 7 | Y4 | C2 | 90 | 82 | 8 | A |
| Example 8 | Y5 | C2 | 90 | 81 | 9 | A |
| Example 9 | Y1 | C3 | 97 | 89 | 8 | A |
| Example 10 | Y4 | C3 | 97 | 88 | 9 | A |
| Example 11 | Y9 | C1 | 98 | 90 | 8 | A |
| Example 12 | Y10 | C1 | 98 | 90 | 8 | A |
| Example 13 | Y9 | C2 | 91 | 82 | 9 | A |
| Example 14 | Y10 | C2 | 90 | 82 | 8 | A |
| Example 15 | Y9 | C3 | 97 | 88 | 9 | A |
| Example 16 | Y10 | C3 | 98 | 89 | 9 | A |
| Comparative Example 1 | Y6 | C1 | 98 | 87 | 11 | B |
| Comparative Example 2 | Y7 | C1 | 98 | 86 | 12 | B |
| Comparative Example 3 | Y8 | C1 | 98 | 85 | 13 | B |
| Comparative Example 4 | Y6 | C2 | 90 | 76 | 14 | B |
| Comparative Example 5 | Y7 | C2 | 90 | 75 | 15 | C |
| Comparative Example 6 | Y8 | C2 | 90 | 72 | 18 | C |
| Comparative Example 7 | Y6 | C3 | 97 | 83 | 14 | B |
| Comparative Example 8 | Y7 | C3 | 97 | 82 | 15 | C |
| Comparative Example 9 | Y8 | C3 | 97 | 74 | 23 | C |
| Comparative Example 10 | Y11 | C1 | 98 | 86 | 12 | C |
| Comparative Example 11 | Y12 | C1 | 98 | 85 | 13 | C |
| Comparative Example 12 | Y11 | C2 | 90 | 72 | 18 | C |
| Comparative Example 13 | Y12 | C2 | 90 | 72 | 18 | C |
| Comparative Example 14 | Y11 | C3 | 97 | 82 | 15 | C |
| Comparative Example 15 | Y12 | C3 | 97 | 81 | 16 | C |

It is obvious from Examples and Comparative Examples that the thermal transfer recording sheet according to the present disclosure enables production of an image in which catalytic fading of a cyan dye is suppressed in a mixture of a yellow dye and a cyan dye.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-028002 filed Feb. 17, 2017, which is hereby incorporated by reference herein in its entirety.

What is claimed is:

1. A coloring compound having a structure represented by Formula (1):

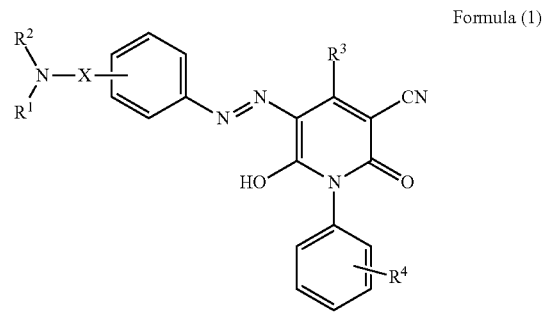

Formula (1)

wherein $R^1$ represents an alkyl group,
$R^2$ represents an alkyl group,
$R^1$ and $R^2$ are the same alkyl groups,
$R^3$ represents an alkyl group, an unsubstituted aryl group, an aryl group having a substituent, or an amino group,
$R^4$ represents a hydrogen atom, an alkyl group, or an alkoxy group, and
X represents a carbonyl group or a sulfonyl group.

2. A thermal transfer recording sheet comprising a base material and a coloring-material layer on the base material, wherein
the coloring-material layer includes a yellow-dye layer containing a yellow dye, a magenta-dye layer containing a magenta dye, and a cyan-dye layer containing a cyan dye,
the yellow dye contains at least one compound selected from compounds having a structure represented by Formula (1) or a structure represented by Formula (2), and the cyan dye contains at least one compound selected from compounds having a structure represented by Formula (3) or a structure represented by Formula (4):

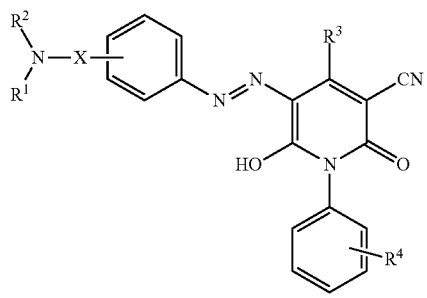

Formula (1)

wherein $R^1$ represents an alkyl group,
$R^2$ represents a hydrogen atom or an alkyl group,
$R^3$ represents an alkyl group, an unsubstituted aryl group, an aryl group having a substituent, or an amino group,
$R^4$ represents a hydrogen atom, an alkyl group, or an alkoxy group, and
X represents a carbonyl group or a sulfonyl group,

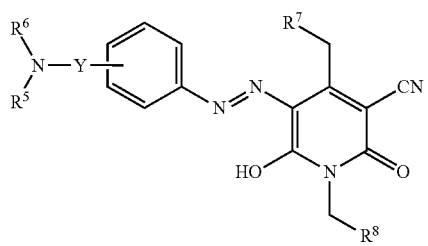

Formula (2)

wherein $R^5$ represents an alkyl group,
$R^6$ represents a hydrogen atom or an alkyl group,
$R^7$ and $R^8$ each independently represent an alkyl group, and
Y represents a carbonyl group or a sulfonyl group,

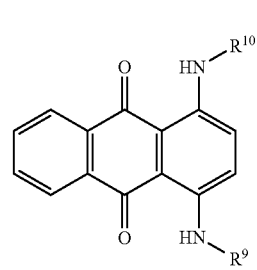

Formula (3)

wherein $R^9$ and $R^{19}$ each independently represent an alkyl group, an unsubstituted aryl group. or an aryl group having a substituent, and

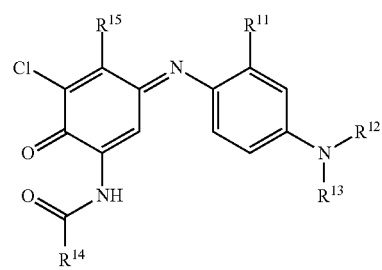

Formula (4)

wherein $R^{11}$ to $R^{15}$ each independently represent an alkyl group, an unsubstituted aryl group, or an aryl group having a substituent.

* * * * *